B. A. BRIGDEN.
OPTICAL COMBINATION.
APPLICATION FILED JUNE 8, 1914. RENEWED NOV. 12, 1915.

1,187,604.

Patented June 20, 1916.

WITNESSES:

INVENTOR
Burt A. Brigden
BY
John A. Bormhardt
ATTORNEY

UNITED STATES PATENT OFFICE.

BURT A. BRIGDEN, OF EAST CLEVELAND, OHIO.

OPTICAL COMBINATION.

1,187,604. Specification of Letters Patent. Patented June 20, 1916.

Application filed June 8, 1914, Serial No. 843,866. Renewed November 12, 1915. Serial No. 61,172.

*To all whom it may concern:*

Be it known that I, BURT A. BRIGDEN, citizen of the United States, residing at East Cleveland, in the county of Cuyahoga and State of Ohio, have invented certain new and useful Improvements in Optical Combinations, of which the following is a specification.

This invention relates to optical combinations, and comprises an arrangement of lenses, prisms and mirrors to reduce the parallax to the minimum in making three color plates or films simultaneously, for process work for projection, or for motion picture records.

In projecting color pictures from three records made through color screens to obtain approximately true color values;—if the records were made simultaneously and with lenses in parallel arrangement and the field of view not restricted there must be and always is a discoloration on edges of detail more or less wide depending on the spacing of the recording lenses and the nearness of objects to the camera.

The objects of the arrangement are, first, to divert the rays laterally and outwardly to permit the lenses to cover a normal angle of view on the plate while receiving them from as nearly a common point with the other members of the combination as the diameter of the middle lens will permit; second, to place the rear members of the combination equidistant from the plate or film; and third, to obtain an unobstructed view in front of each combination.

In this device, the middle lens must carry the red rays, as through it there is no loss of illumination by prisms and mirrors, because through a red filter on a properly sensitized film a much longer exposure is required than through a blue or green filter. If lenses were used under the same conditions for the three colors, blue and green would be over exposed or red under exposed. The exposure may be equalized by stopping down blue and green, or using an added absorbing screen. In the present device there is a loss in the blue and green by passing the same through prisms, and by reflection from the mirror surfaces. This is not detrimental, as only blue and green records are affected, and each must be still further subdued by absorbing screens or stops. Therefore red is recorded through the middle lens and green and blue through the side combinations. Parallax is reduced practically to elimination by placing the light receiving members of the side combinations as close to the middle lens as possible, and reflecting the rays laterally to accommodate the necessary partitions and afford the necessary recording space.

Figure 1:
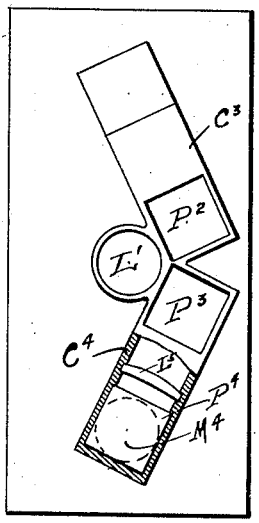
Figure 2:
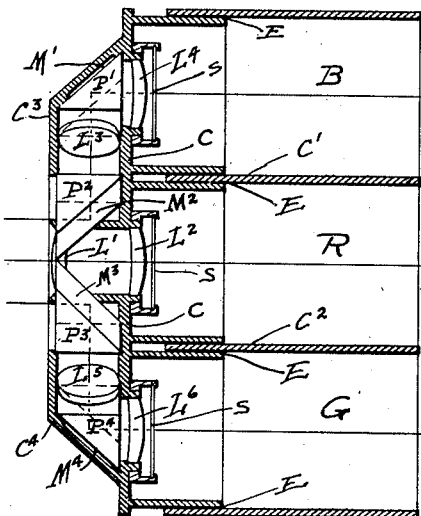
Figure 3:
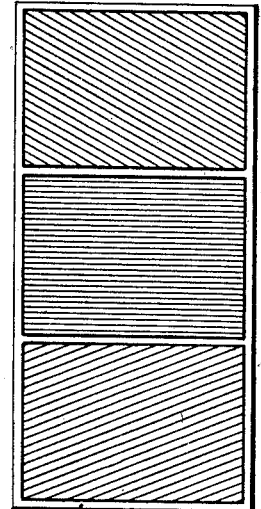
Figure 3:
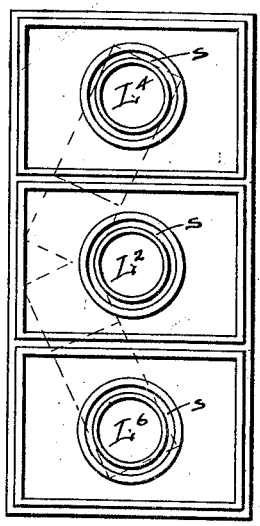
Figure 4:
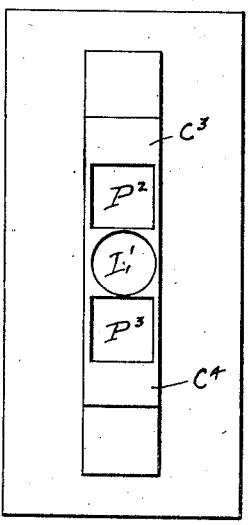

In the accompanying drawings:—Figure 1 is a front view of one arrangement partly broken away. Fig. 2 is a sectional side view. Fig. 2ª is a color diagram. Fig. 3 is a rear view. Fig. 4 is a front view of a modification, and Fig. 5 is a sectional side view of Fig. 4.

Referring specifically to the drawings, $L^1$ $L^2$ indicate the middle combination arranged at the front of the casing C, said casing having partition walls $C^1$ $C^2$ for separating the same into three compartments B, R and G for the blue, red and green rays respectively. Suitable color screens S can be located in any suitable position.

$P^2$ and $P^3$ are front reflecting prisms of the side combinations located closely adjacent the middle lens, and therefore receive rays at a small angle or distance with respect to the axis of the middle lens. These rays are diverted laterally by the mirrors $M^2$ and $M^3$ through reversing combinations or objectives composed of lens 13, prisms $P'$, mirror $M'$ and lens $L^4$ on one side, and lens $L^5$, prisms $P^4$, mirror $M^4$ and lens $L^6$ on the other side, and the rays are then again parallel and will focus at the proper distance on a plate or film F located behind the casing, and the size of the record of the sections B, R and G may be larger or smaller according to the focal length of the lenses selected and the spacing between the mirrors $M^1$ and $M^2$ and $M^3$ and $M^4$, and a larger or smaller construction of the compartments between the partitions. Accessory apparatus such as stopping devices may be used, but it is unnecessary to illustrate them. Focusing slides indicated E may be used as a part of the casing.

Figure 5:
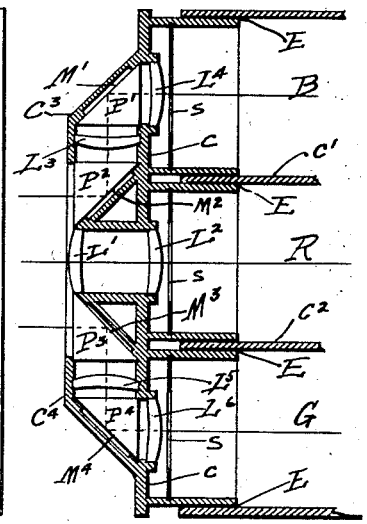

In the arrangement shown in Figs. 1, 2 and 3, it will be noticed that the front prisms $P^2$ and $P^3$ are located at an angle, or in an angular relation, with respect to the middle lens, instead of in a straight line with respect thereto, as in Figs. 4 and 5. Nevertheless in the former the axes of the lenses $L^2$, $L^4$ and $L^6$, are in line, due to the angular extension of the casings $C^3$ and $C^4$ which are located at the front of the main casing and which contain the reflecting elements. The former arrangement, that is the one shown in Figs. 1, 2 and 3, is somewhat preferable to the latter, however, because while each prism is as close to the central lens as possible, the prisms or side combinations are much closer to each other than in Figs. 4 and 5, hence the parallax between green and blue is no greater, or but very slightly so, than either with the red, consequently the marginal discoloration of objects in the projected picture, incident to parallax, will not only be reduced to a minimum, but will be composed equally of the three colors, instead of the outer two only, which occurs when records are secured through three parallel and alined lenses, in which the projections show noticeable blue and green edges under certain conditions. That is, in the arrangement shown in Figs. 1, 2 and 3, the lens $L^1$ and the prisms $P^2$ and $P^3$, are set or arranged around a common center with respect to their axes, or in cluster arrangement, as distinguished from any lineal arrangement and hence a projected picture from records derived from the cluster arrangement (Fig. 1) will show, (if any) a marginal discoloration mostly in secondary colors because near objects will obscure slightly different detail in a distant background and this difference will be observed on all sides and in a minimum degree, whereas a projection from records made with the ordinary arrangement of parallel lenses, shows marginal discolorations much wider and in primary colors at opposite sides of the detail, giving the impression of parallel stripes or scratches of the two outer colors.

The arrangement shown in Fig. 4 has advantages, because it reduces the parallax to the minimum in any lineal arrangement. In each embodiment, however, the rear lenses $L^2$, $L^4$ and $L^6$ are located at the same distance from the film or plate and lenses of the same focal length can be used and the records will be the same in detail and angular extent so far as the eye can determine, a result which cannot be secured by lenses of different focal lengths. So either arrangement has advantages over known arrangements, and the form shown in Fig. 1 has advantages over that shown in Fig. 4.

In practical use the front prisms $P^2$, $P^3$ will vary in size according to the specific instrument in which the combination is placed. The wider the angle of view required on the record, the larger the front prisms must be made, and the wider will be the space between the back lenses.

What I claim as new is:—

1. An optical combination for multicolor work, comprising a middle objective having front and rear lenses, and side objectives beside said middle objective, each side objective comprising a front lens with its axis at an angle to the axis of the middle objective, and a rear lens with its axis parallel to that of the middle objective, and a reflector between the front and rear lenses of the side objectives, the rear lens of all the objectives being located in transverse alinement, and a reflector located between the middle objective and the front lens of each side objective.

2. An optical combination for multicolor work, comprising middle and side objectives having front and rear lenses, the latter being arranged in transverse alinement with axes parallel, and the front lenses of the side objectives having their axes at an angle to the axes of the rear lenses, reflectors between the front and rear lenses of the side objectives, and reflectors located closely adjacent to the front lens of said middle objective and behind the field of view thereof and adapted to divert rays laterally and outwardly to the side objectives.

3. An optical combination comprising a central objective having front and rear lenses and side combinations each having a reflector located closely adjacent the central objective and behind the field of view thereof, each of said combinations having an objective receiving light from said reflector and including a front lens, a mirror, and a rear lens in alinement with the rear lens of the central objective.

4. The combination of a middle objective composed of front and rear lenses and a color screen, two reflecting prisms extending rearwardly from the edge of the front lens and forming therewith three light-receiving members in close proximity to each other and each with an unobstructed field of view, and two side objectives to which light is transmitted by said prisms, and each provided with a color screen, each of said side objectives comprising front and rear lenses and a reflector therebetween, the front lens being arranged with its axis at an angle to the axis of the front lens of the middle objective, and the rear lens being in alinement with the rear lens of the middle objective, the three objectives being of equal focal length and focusing on the same plane.

5. An optical combination for multicolor work, comprising midde and side objectives having front and rear lenses, reflectors between the front and rear lenses of the side objectives, the front lenses of the side objectives being located with their axes in angular relation to the axis of the middle objective, and reflectors coöperating with the side objectives to transmit light thereto and located closely adjacent and to the rear of the front lens of the middle objective, the last mentioned reflectors and said middle objective being arranged in angular positions around a common center, and the rear lenses of all of the objectives being in alinement and in the same plane.

In testimony whereof, I affix my signature in presence of two witnesses.

BURT A. BRIGDEN.

Witnesses:
　JOHN A. BOMMHARDT,
　ALTON H. BEMIS.